United States Patent [19]

Salinger

[11] 4,010,348

[45] Mar. 1, 1977

[54] HEATER ROD SUPPORT BRACKET FOR RADIANT HEATER ASSEMBLY

[75] Inventor: Fred G. Salinger, Baltimore, Md.

[73] Assignee: Electro-Therm, Inc., Laurel, Md.

[22] Filed: Oct. 31, 1974

[21] Appl. No.: 519,462

[52] U.S. Cl. .................................. 219/347; 15/259; 165/55; 174/40 CC; 219/357; 219/536; 248/65; 338/316

[51] Int. Cl.[2] ........................ H05B 302; F24H 9/02; F16L 3/08

[58] Field of Search .......... 219/339, 342, 343, 347, 219/348, 350–357, 536, 365; 338/316; 248/300, 73, 65, 50; 174/40 CC; 165/55; 15/259 R

[56] References Cited

UNITED STATES PATENTS

| | | | |
|---|---|---|---|
| 2,627,014 | 1/1953 | Kolb | 219/357 X |
| 2,733,049 | 1/1956 | Carter | 165/55 |
| 3,003,736 | 10/1961 | Hofgesang | 248/300 X |
| 3,014,680 | 12/1961 | Steinbach | 248/50 |
| 3,032,638 | 5/1962 | Hall | 219/347 X |
| 3,152,241 | 10/1964 | Ammerman | 219/347 UX |
| 3,171,945 | 3/1965 | Meng et al. | 219/357 X |
| 3,180,597 | 4/1965 | Havener | 248/73 UX |
| 3,294,955 | 12/1966 | Anoff | 338/316 |

FOREIGN PATENTS OR APPLICATIONS

| | | | |
|---|---|---|---|
| 908,725 | 10/1962 | United Kingdom | 219/347 |

*Primary Examiner*—A. Bartis
*Attorney, Agent, or Firm*—Richard G. Kinney

[57] ABSTRACT

A bracket means for supporting at least one heater rod disposed within an open - front housing of an electric radiant heater assembly comprises at least one bracket having an elongate, generally flat, planar brace portion having clip means at opposite ends for removable engagement with the housing. At least one integral support arm located intermediate the ends of the brace portion and disposed normal thereto is provided with an arcuate surface which serves as a seat for the heater rod. The bracket is insertable into the housing through the open front and rotatable to bring the arcuate portion into supporting engagement with the rod and the clips into engagement with the housing. The brace portion is made of a nickel - chrome alloy having spring like characteristics at elevated temperatures.

8 Claims, 8 Drawing Figures

HEATER ROD SUPPORT BRACKET FOR RADIANT HEATER ASSEMBLY

BACKGROUND OF THE INVENTION

The present invention relates in general to electric radiant heaters, and, more particularly, to novel and improved brackets for supporting heater rods therein.

DESCRIPTION OF THE PRIOR ART

Known electric radiant heaters, such as infra-red heaters, typically comprise at least one electrically energized heater rod element of extended length disposed within a preferably parabolic reflector housing, each rod being provided with at least one supporting clip or bracket, disposed intermediate its ends, to prevent rod sagging due to internal heat developed during heater operation.

In prior known electric radiant heaters, brackets and heater rods are supplied as an assembled combination, whereby rod replacement requires installations of new support brackets. In radiant heaters having more than one heater rod, failure of one rod generally requires replacement of both rods. Furthermore, prior known heater rod support brackets frequently lose their spring-like characteristics and eventually become loosely disposed within the housing, thereby failing to provide adequate rod support.

SUMMARY OF THE INVENTION

The present invention comprises a simple, inexpensive heater rod support bracket which can be readily installed in, or removed from, a radiant heater assembly after the heater rod or rods have been secured therein. The bracket of the present invention comprises an arcuate brace means having spring-like characteristics at elevated heater rod temperatures, thereby providing excellent heater rod support during prolonged heater operation.

In general, the heater rod support bracket of the present invention comprises: arcuate brace means having clip means at opposite ends thereof for removable engagement with the radiant housing, support means being connected to the brace means and being disposed substantially intermediate the ends of the brace means and substantially normal thereto, and arcuate rod-holding means connected to the support means and being removably engageable around at least one heater rod for support thereof normal to the axis of the rod. The bracket is readily engageable with, or removable from, the heater rod or rods after installation thereof.

DESCRIPTION OF THE PREFERRED EMBODIMENTS

Figure 1:
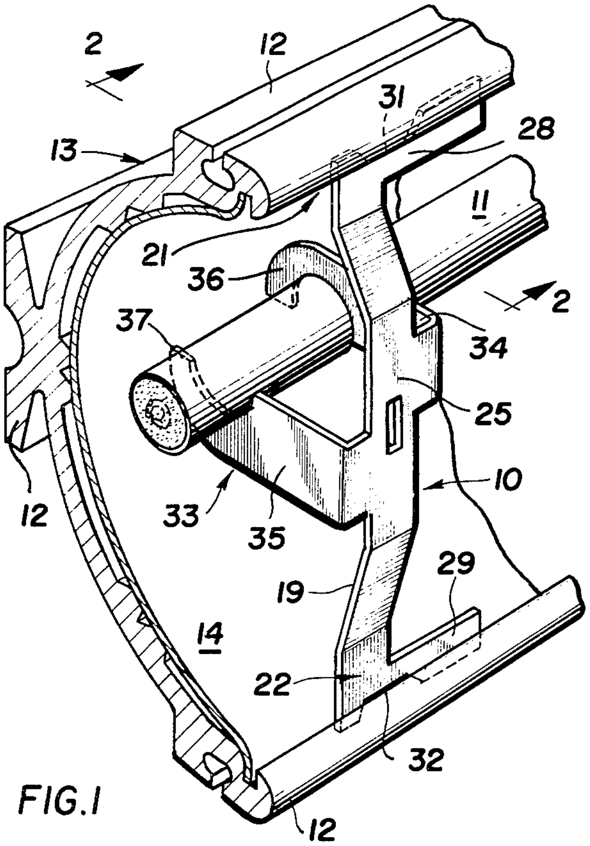
FIG. 1 is a perspective view of one preferred embodiment of the heater rod support bracket of the present invention, adapted for use in an electric radiant heater having a single heater rod, only a portion of the heater being illustrated.

As best shown in FIGS. 1–4, one preferred embodiment of the present invention comprises a heater rod support bracket, generally illustrated by reference numeral 10, for supporting a single electrically energized heater rod element 11 longitudinally disposed within a housing 12 of a known electric radiant heater, such as an infra-red heater, generally illustrated by numeral 13, only a portion of the heater being illustrated. Heater rod 11 is typically of an extended length, and is supported at its ends by known support means (not shown) upon installation thereof. Heater 13 comprises a preferably parabolic reflector 14, with heater rod 11 being disposed at the focus thereof.

Figure 2:
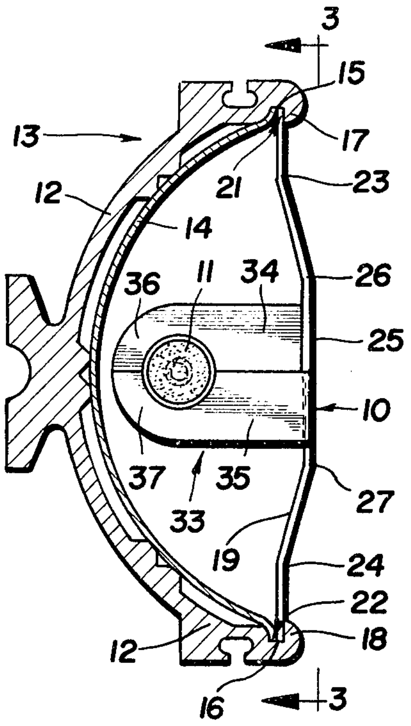
FIG. 2 is a side elevational view taken substantially on the line 2—2 of FIG. 1.

As best shown in FIG. 2, housing 12 comprises an upper slot 15 and a lower slot 16, substantially adjacent to ends of the housing, to define an upper lip 17 and a lower lip 18, respectively. Bracket 10 comprises an arcuate brace means 19 having an upper clip means 21 and a lower clip means 22 (FIGS. 1–4) at opposite ends thereof for removable engagement with upper slot 15 and lower slot 16, respectively. Brace means 19 preferably comprises an easily formed corrosionresistant stainless steel or nickel-chrome alloy strip having spring-like characteristics at elevated heater rod temperatures, the strip ranging between 0.02 and 0.04 inches in thickness, with the preferred thickness being 0.31 inches. Brace means 19 is a bow-shaped or arcuate spring strip bent outwardly with respect to the heater rod 11 at an upper outward bend 23 (FIG. 2) and at a lower outward bend 24, and inwardly to join an integral substantially vertical intermediate portion 25 at an upper inward bend 26 and a lower inward bend 27. When bracket 10 is removed from engagement with housing 12, the distance between the outer edges of the upper and lower clip means 21, 22 slightly exceeds the distance between the inner recesses of upper and lower slots 15, 16, whereby insertion of the bracket into engagement with the housing effects spring-urged engagement of upper and lower clip means 21, 22 into associated slots 15, 16, respectively.

Figure 3:
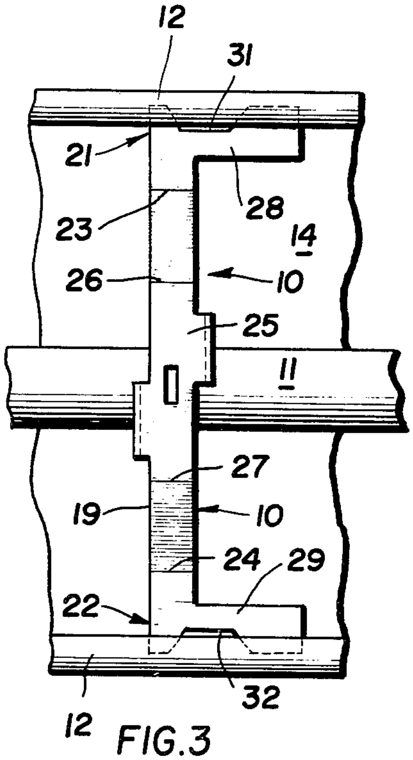
FIG. 3 is a front elevational view taken substantially on the line 3—3 of FIG. 2.
Figure 4:
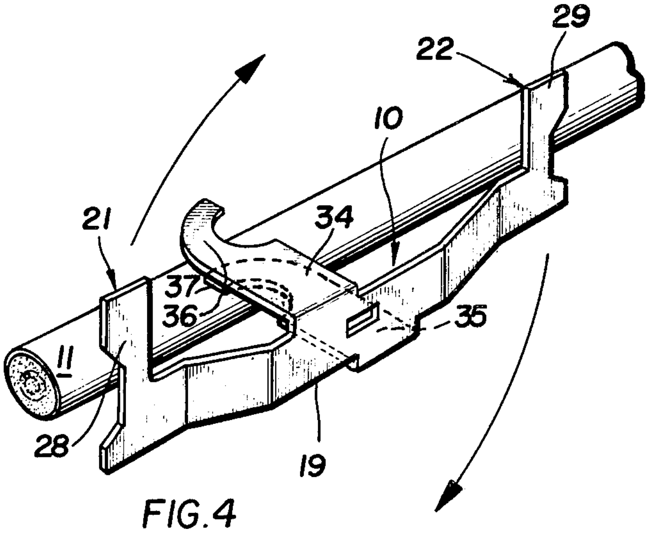
FIG. 4 is a perspective view similar to FIG. 1, showing the initial step in the installation of the heater rod support bracket illustrated in FIGS 1–3.

As best shown in FIGS. 1, 3 and 4, upper clip means 21 comprises an arm 28, and lower clip means 22 comprises an arm 29, each arm being substantially coplanar with brace means 19 and angled substantially 90° therewith. Upper arm 28 comprises a recess 31, and lower arm 29 comprises a recess 32, for a purpose to be described.

With referene to FIGS. 1 and 2, support bracket 10 further comprises a support means, generally illustrated by numeral 33, comprising an upper arm 34 and a lower arm 35, each arm being integrally formed with brace means 19 substantially intermediate clip means 21, 22 and normal to the brace means. An upper arcuate rod-holding means 36 and a lower arcuate rod-holding means 37 are integrally formed with support means 34 and 35, respectively, for circumferentially engaging the upper and lower surfaces of rod 11 for support thereof normal to the axis of the rod to prevent sagging thereof during prolonged heater operation.

As shown in FIG. 4, in order to install support bracket 10, the bracket is first placed substantially parallel to the rod 11 with rod-holding means 36, 37 disposed adjacent to the rod. Then bracket 10 is rotated clockwise, as viewed in FIG. 4, to its FIG. 3 position normal to the axis of the rod 11, with one of the clip means 21, 22 engaging an associated one of the slots 15, 16 in housing 12. For example, assuming that clip means 22 engages slot 16, clip means 22 will be initially disposed exteriorly of the housing 12 to overlie lip 17, arm 28 having recess 31 to enable prying that arm into slot 15 by means of a bladed tool engaging both the recess 31 and lip 17. Of course, it is immaterial which clip means 21, 22 is initially placed into its associated slot. Thus, brace means 19 is rotatable to effect snap-fit engagement of each clip means 21, 22 into associated slots 15, 16 without rod removal. Similarly, bracket 10 can be easily removed from its rod-supporting position by simply prying one of the clip means 21, 22 free of engagement with its associated slot 15, 16, and then rotating the bracket 10 counter-clockwise, as viewed in FIG. 3.

With reference to FIGS. 5–8, a second preferred embodiment of the present invention comprises a heater rod support bracket, generally illustrated by reference numeral 40, for supporting a pair of upper and lower heater rods 41 and 42 disposed within a housing 43 of a known electric radiant heater generally illustrated by numeral 44, similar to heater 13, only a portion of heater 44 being illustrated. Heater 44 comprises a preferably parabolic reflector 45, with heater rods 41, 42 being disposed at or near the focus thereof.

Figure 5:
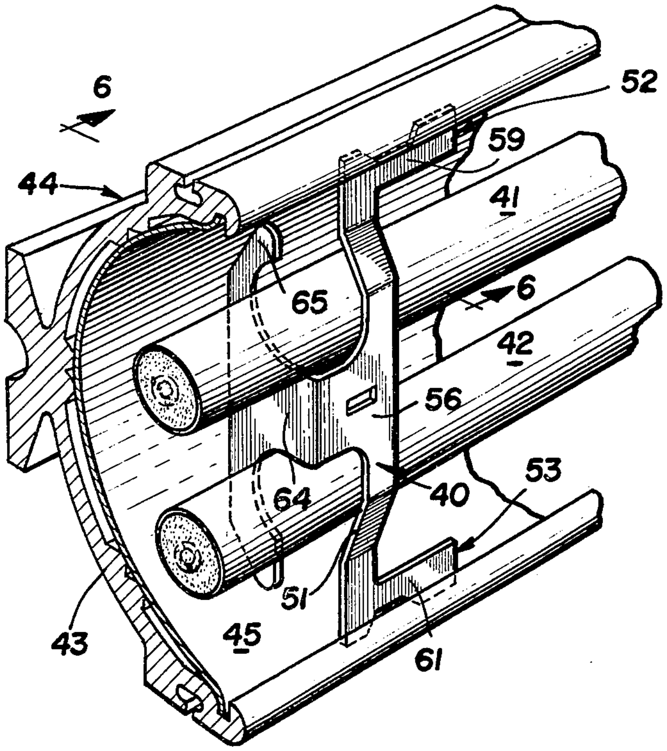
FIG. 5 is a perspective view of another preferred embodiment of the heater rod support bracket of the present invention, adapted for use in an electric radiant heater having two parallel upper and lower heater rods, only a portion of the heater being illustrated.
Figure 6:
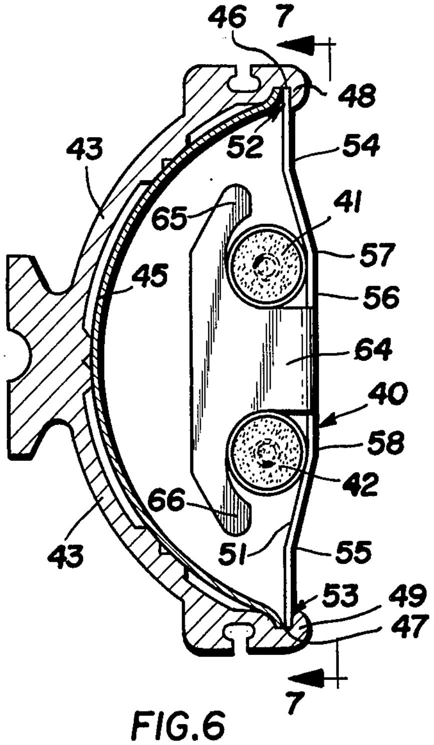
FIG. 6 is a side elevational view taken substantially on the line 6—6 of FIG. 5.

As best shown in FIG. 6, housing 43 comprises an upper slot 46 and a lower slot 47, substantially adjacent to ends of the housing, to define an upper lip 48 and a lower lip 49, respectively. Bracket 40 comprises an arcuate brace means 51 having an upper clip means 52 and a lower clip means 53 (FIGS. 5–8) at opposite ends thereof for removable engagement with upper slot 46 and lower slot 47, respectively. Brace means 51 preferably comprises a stainless steel strip having spring-like characteristics at elevated heater rod temperatures, similar to brace means 19, brace means 51 comprising a bow-shaped or arcuate spring strip bent outwardly with respect to the heater rods 41, 42 at an upper outward bend 54 (FIG. 6) and at a lower outward bend 55, and inwardly to join an integral substantially vertical intermediate portion 56 at an upper inward bend 57 and a lower inward bend 58, similar to brace means 19. When bracket 40 is removed from engagement with housing 43, the distance between the inner recesses of upper and lower slots 46, 47, whereby insertion of the bracket into engagement with the housing effects spring-urged engagement of upper and lower clip means 52, 53 into associated slots 46, 47, respectively.

Figure 7:
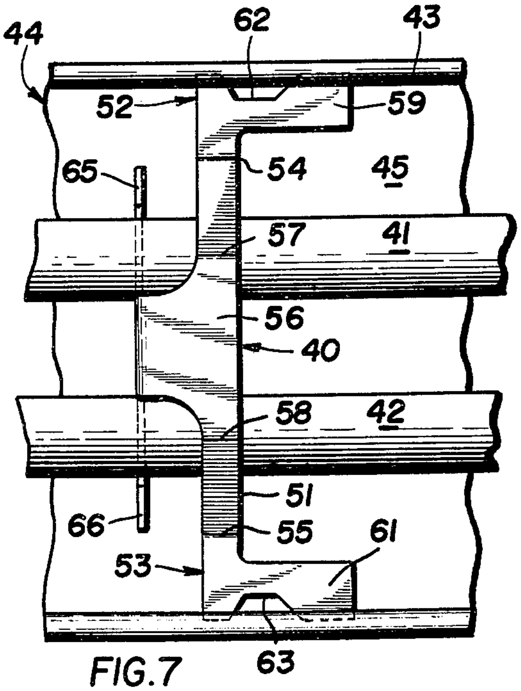
FIG. 7 is a front elevational view taken substantially on the line 7—7 of FIG. 6.
Figure 8:
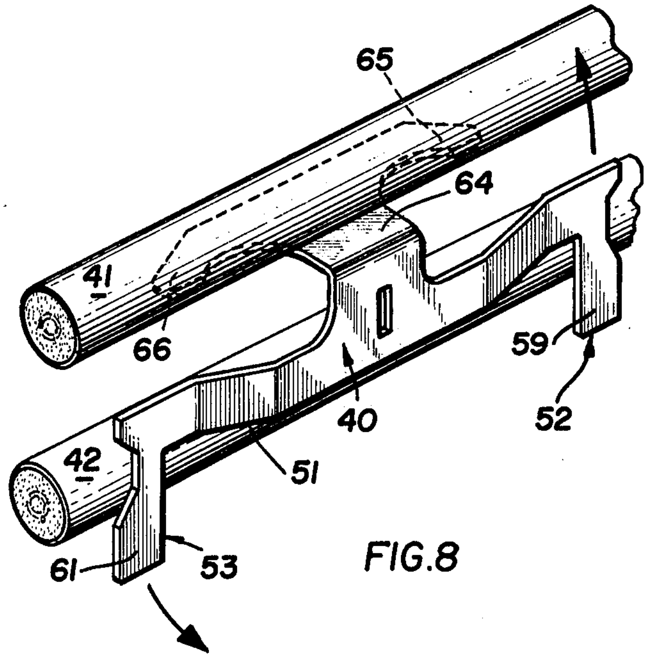
FIG. 8 is a perspective view, similar to FIG. 5, showing the initial step in the installation of the heater rod support bracket illustrated in FIGS. 5–7.

As best shown in FIGS. 5, 7 and 8, upper clip means 52 comprises an arm 59, and lower clip means 53 comprises an arm 61, each arm being substantially coplanar with brace means 51 and angled substantially 90° therewith. Upper arm 59 comprises a recess 62, and lower arm 61 comprises a recess 63, similar to recesses 31 and 32 in arms 28, 29, respectively.

With reference to FIGS. 5 and 6, support bracket 40 further comprises a single arm support means, generally illustrated by numeral 64, integrally formed with brace means 51 substantially intermediate clip means 52, 53 and normal to the brace means, support means 64 being operatively disposed between rods 41, 42. An upper arcuate rod-holding means 65 and a lower arcuate rod-holding means 66 are integrally formed with support means 64 for partially circumferentially engaging the sufaces of the rods 41 and 42, respectively, for support thereof normal to the rod axes to prevent rod sagging.

As shown in FIG. 8, in order to install support bracket 40, the bracket is first placed substantially parallel to rods 41, 42 with support means 64 being disposed in the region between the rods. Then bracket 40 is rotated counterclockwise, as viewed in FIG. 8, to its FIG. 7 position normal to the axes of rods 41, 42, with one of the clip means 52, 53 engaging an associated one of the slots 46, 47 in the housing 43, the other clip means being pried into its associated slot, in a manner similar to that previously described with respect to bracket 10, without removal of either rod.

It is thought that the invention and many of its attendant advantages will be understood from the foregoing description, and it will be apparent that various changes may be made in the form, construction and arrangement of the component parts without departing from the spirit and scope of the invention or sacrificing all of its material advantages, the forms described being merely preferred embodiments thereof.

The embodiments of the invention in which an exclusive property or privilege is claimed are defined as follows:

1. In an electric radiant heater assembly of the type which includes a housing having an open front defined between at least two spaced apart housing edges at least one heater rod disposed within the housing and bracket means for supporting the rod in the housing, the improvement residing in said bracket means comprising at least one bracket having an elongate, generally flat, planar brace portion, clip means at each end of said brace portion for removably engaging the housing thereby removably to mount said bracket in the housing, at least one support arm which is integral with said brace portion, which is located intermediate the ends of said brace portion and which extends outwardly from said brace portion at an angle of approximately 90° thereto, said support arm having at least one arcuate surface which engages, and serves as a seat for, the rod, and said bracket being configured and arranged (a) for being inserted into the housing through the open front thereof in a first position where said brace portion is parallel to the heater rod and where said suppot arm projects inwardly but does not engage the rod, said insertion being without rod removal, and (b) for being rotated approximately 90° within the housing in a plane generally parallel to a plane containing the open front defining edges to a second position constituting said mounted position where said clip means engage the housing edges to secure said bracket in place and said arcuate rod seating surface of said support arm engages the rod.

2. The assembly according to claim 1 wherein said housing edges have an upper slot and a lower slot each for engaging one of said clip means, and wherein said brace portion is made of a spring material whereby said brace portion urges each said clip means into an associated slot.

3. The assembly according to claim 2 wherein said housing is substantially parabolic in shape, each said slot being disposed substantially adjacent one open front defining edge of said housing to define a lip in conjunction therewith, and wherein each said clip means comprises a clip arm which extends at an angle of substantially 90° from said brace portion and at an angle of substantially 90° with respect to said support arm, each said clip arm having a recess sized to receive between said clip arm and said lip a bladed tool which can engage said clip arm for prying said clip arm over said adjacent lip and into the associated slot.

4. The bracket according to claim 1 wherein said brace portion is made of a nickel-chrome alloy strip having spring-like characteristics at elevated heater rod temperatures.

5. The bracket according to claim 1 wherein each said clip means comprises a clip arm which is substantially coplanar with said brace portion and which extends at an angle of substantially 90° from said brace portion and at an angle of substantially 90° with respect to said support arm.

6. The assembly according to claim 1 wherein said heater comprises a single rod and said bracket has two support arms integrally formed with and extending from said brace portion, said two support arms forming upper and lower rod-holding arms each having a generally semi-circular arcuate surface which circumferentially engage upper and lower surfaces of said rod, respectively.

7. The bracket according to claim 1 being formed from a generally flat piece of metal with said support arm being bent from said brace portion such that said support arm lies in a plane substantially 90° to the plane of said brace portion, and one edge of said support arm being arcuate to form said arcuate seating surface.

8. The assembly according to claim 1 comprising at least two parallel spaced heater rods and wherein said support arm of said bracket is generally flat and generally T-shaped, the base of the T being integral with said brace portion and each side of the cross of the T having an arcuate surface which engages, and serves as a seat for, one of said rods, the cross of the T permitting said support arm to be inserted to said first position which is between and parallel to said rods and then rotated to said second position where the cross the T is normal to said rods and each arcuate surface engages one of said rods.

* * * * *